(12) United States Patent
Enomoto

(10) Patent No.: US 7,251,080 B2
(45) Date of Patent: Jul. 31, 2007

(54) ZOOM LENS SYSTEM

(75) Inventor: Takashi Enomoto, Chiba (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/187,969

(22) Filed: Jul. 25, 2005

(65) Prior Publication Data

US 2006/0018034 A1   Jan. 26, 2006

(30) Foreign Application Priority Data

Jul. 26, 2004  (JP) ............................. 2004-217094

(51) Int. Cl.
*G02B 15/14* (2006.01)
*G02B 15/04* (2006.01)

(52) U.S. Cl. ...................... 359/676; 359/684

(58) Field of Classification Search ................ 359/680, 359/682, 684, 676, 677

See application file for complete search history.

(56) References Cited

U.S. PATENT DOCUMENTS

| | | |
|---|---|---|
| 5,910,860 A | 6/1999 | Ozaki et al. |
| 6,025,961 A | 2/2000 | Kohno et al. |
| 6,169,635 B1 | 1/2001 | Ozaki et al. |
| 6,268,964 B1 | 7/2001 | Ozaki et al. |

FOREIGN PATENT DOCUMENTS

| | | |
|---|---|---|
| JP | 10-282416 | 10/1998 |
| JP | 2001-194589 | 7/2001 |
| JP | 2002-244038 | 8/2002 |

OTHER PUBLICATIONS

English language Abstract of JP 10-282416.

*Primary Examiner*—Alicia M Harrington
(74) *Attorney, Agent, or Firm*—Greenblum & Bernstein, P.L.C.

(57) ABSTRACT

A zoom lens system includes a negative first lens group, a diaphragm, and a positive second lens group, in this order from the object. Zooming is performed by moving the negative first lens group and the positive second lens group along an optical axis of the zoom lens system. The negative first lens group includes a negative first lens element, a negative second lens element, and a positive third lens element, in this order from the object.

29 Claims, 11 Drawing Sheets

Fig. 1
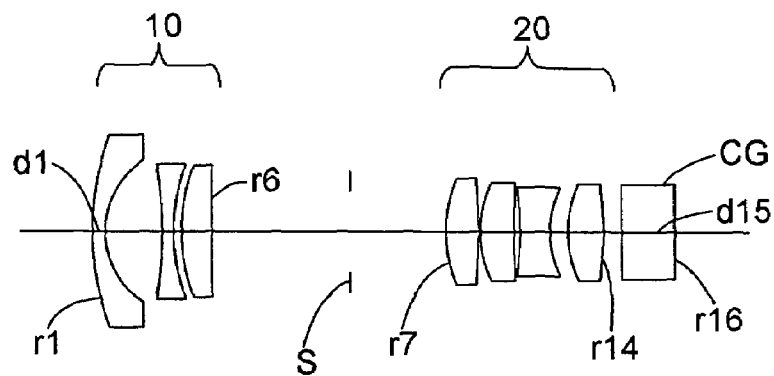
Fig. 2A
FNo.= 1: 1.9
—— d Line
······· g Line
---- C Line
-0.2   0.2
SPHERICAL
ABERRATION
CHROMATIC
ABERRATION
Fig. 2B
W= 49.1°
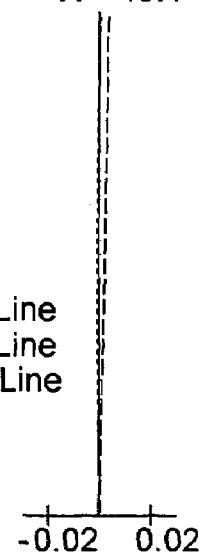
-0.02   0.02
LATERAL
CHROMATIC
ABERRATION
Fig. 2C
W= 49.1°
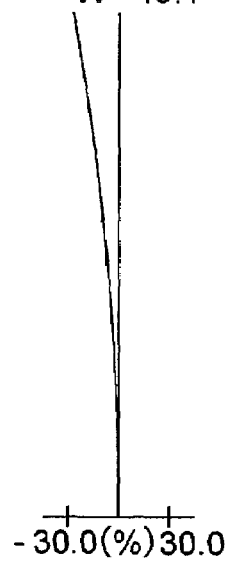
— S
-- M
-0.2   0.2
ASTIGMATISM
Fig. 2D
W= 49.1°
-30.0(%)30.0
DISTORTION FNo.=1: 3.1

—— d Line
······ g Line
– – – C Line

-0.2   0.2
SPHERICAL
ABERRATION
CHROMATIC
ABERRATION

W=19.9°

-0.02   0.02
LATERAL
CHROMATIC
ABERRATION

W=19.9°

— S
-- M

-0.2   0.2
ASTIGMATISM

W=19.9°

-30.0(%)30.0
DISTORTION

Fig. 4
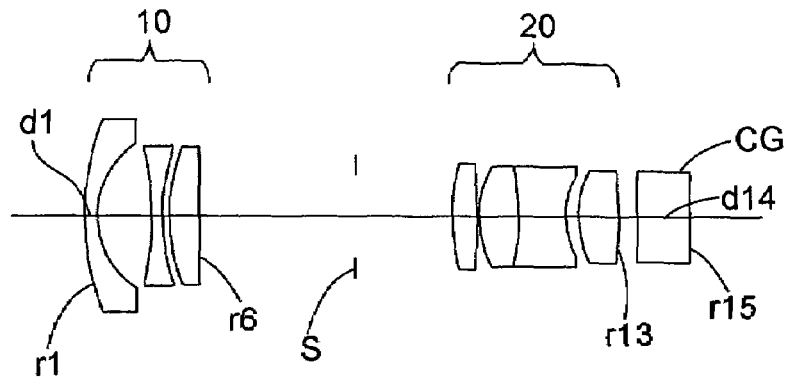
Fig. 5A
FNo = 1: 1.9
Fig. 5B
W=49.1°
Fig. 5C
W=49.1°
Fig. 5D
W=49.1°
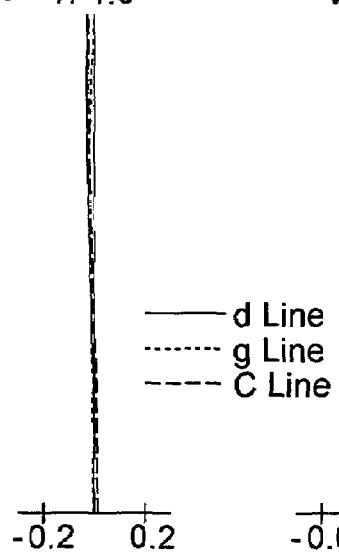
——— d Line
········· g Line
- - - - C Line
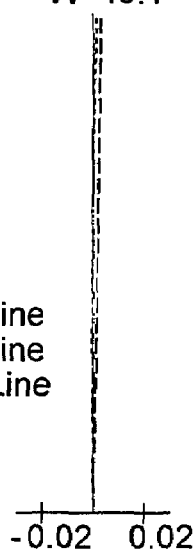
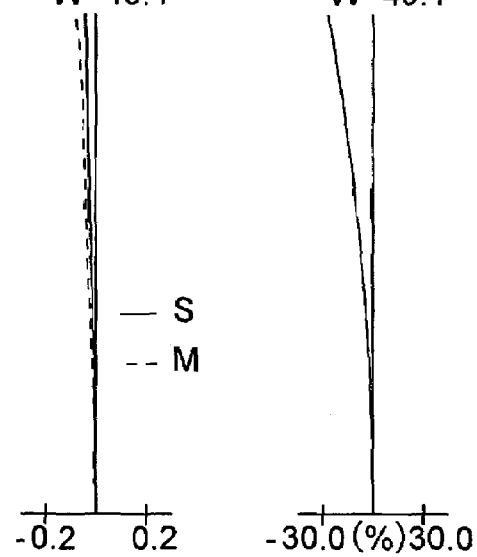
——— S
- - M
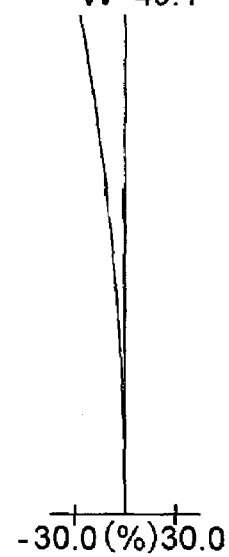
-0.2   0.2
-0.02   0.02
-0.2   0.2
-30.0 (%) 30.0
SPHERICAL
ABERRATION
CHROMATIC
ABERRATION
LATERAL
CHROMATIC
ABERRATION
ASTIGMATISM
DISTORTION

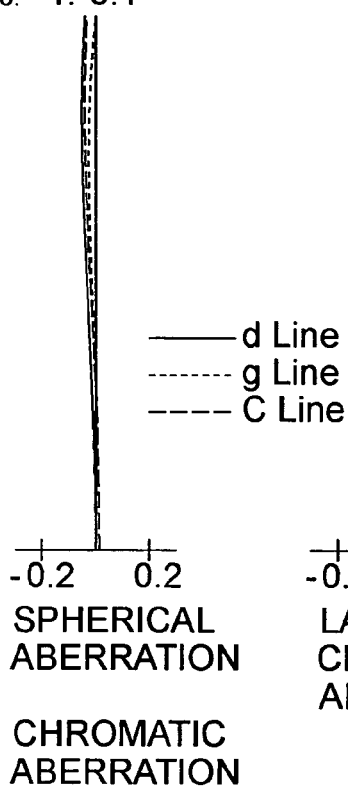
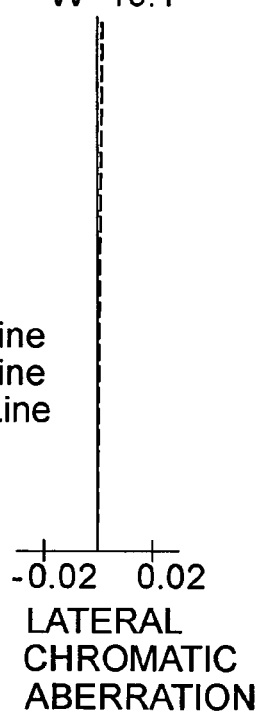
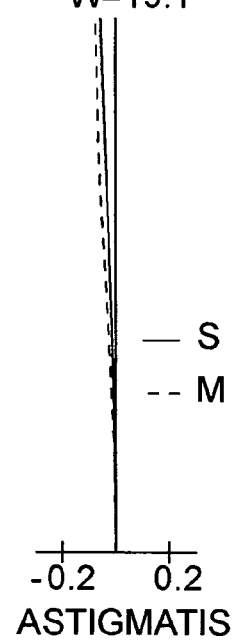
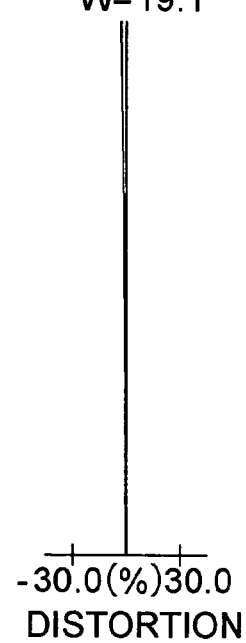
Fig. 6A  FNo.= 1: 3.1  SPHERICAL ABERRATION  CHROMATIC ABERRATION
Fig. 6B  W=19.1°  LATERAL CHROMATIC ABERRATION
Fig. 6C  W=19.1°  ASTIGMATISM
Fig. 6D  W=19.1°  DISTORTION Fig. 7
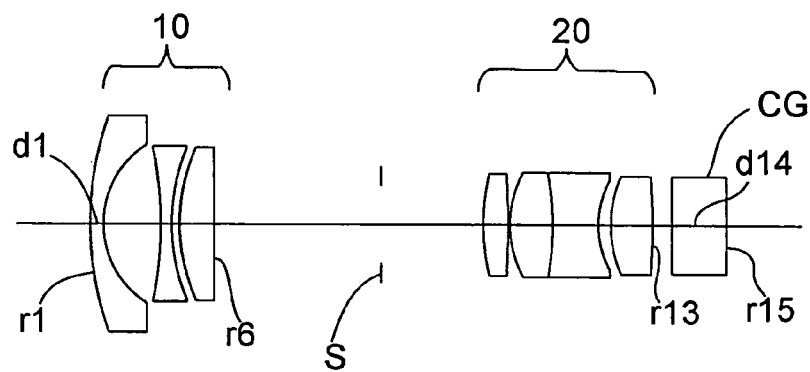
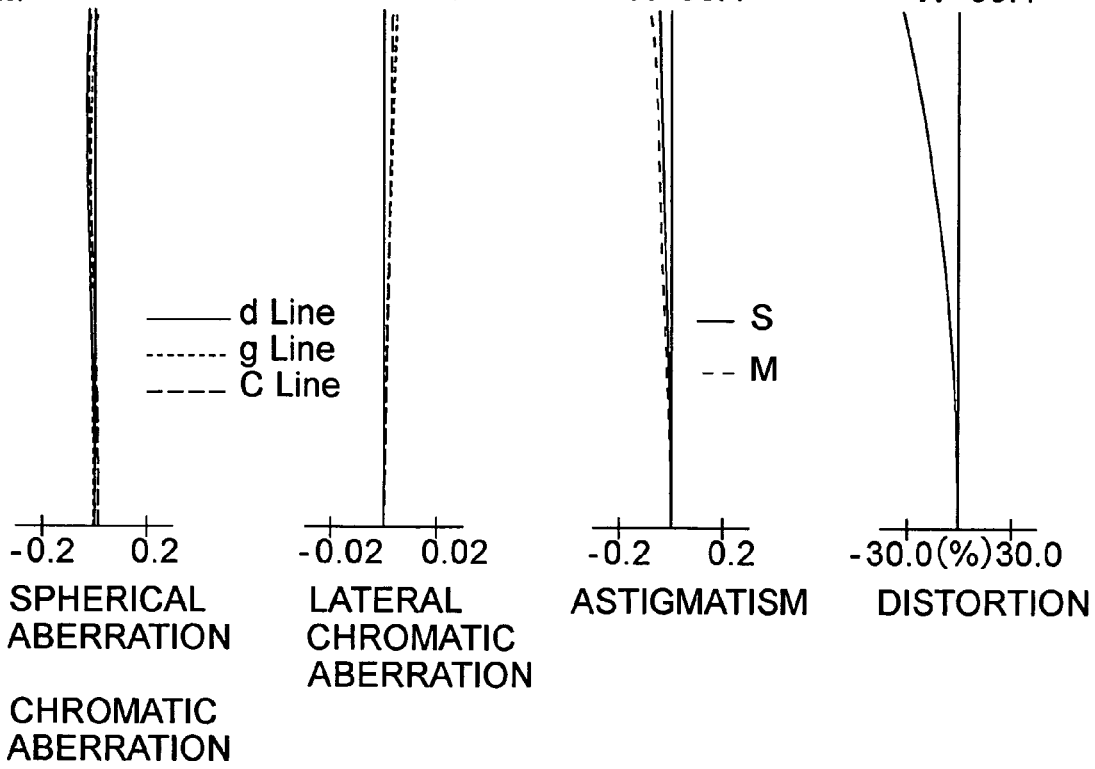

FNo.= 1: 3.1

-0.2    0.2
SPHERICAL
ABERRATION

CHROMATIC
ABERRATION

W=20.6°

-0.02   0.02
LATERAL
CHROMATIC
ABERRATION

W=20.6°

-0.2    0.2
ASTIGMATISM

W=20.6°

-30.0(%) 30.0
DISTORTION

Fig. 10
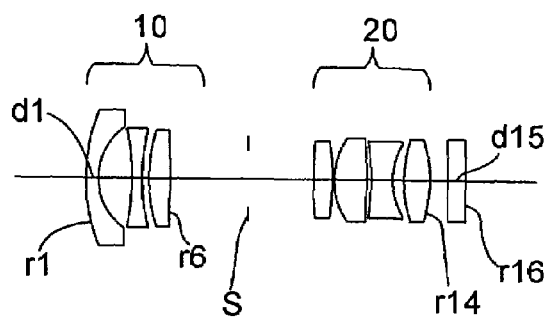
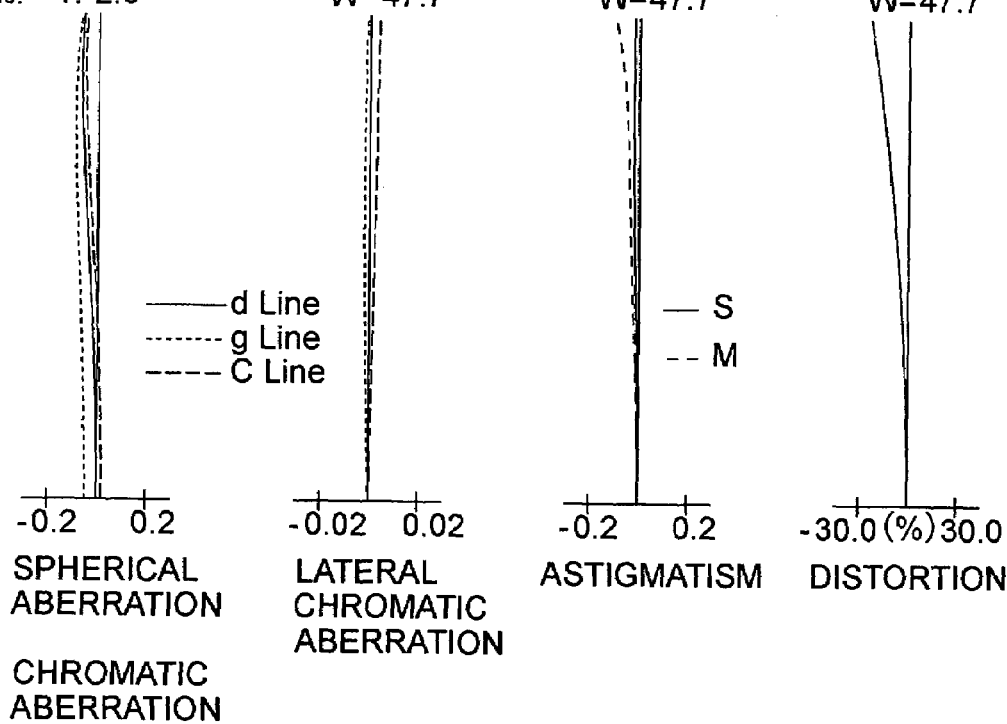
Fig. 11A
FNo.= 1: 2.0
SPHERICAL ABERRATION
CHROMATIC ABERRATION
Fig. 11B
W=47.7°
LATERAL CHROMATIC ABERRATION
Fig. 11C
W=47.7°
ASTIGMATISM
Fig. 11D
W=47.7°
DISTORTION FNo.= 1: 3.0

—— d Line
-------- g Line
---- C Line

-0.2   0.2
SPHERICAL
ABERRATION

CHROMATIC
ABERRATION

W=24.5°

-0.02  0.02
LATERAL
CHROMATIC
ABERRATION

W=24.5°

— S
-- M

-0.2   0.2
ASTIGMATISM

W=24.5°

-30.0 (%) 30.0
DISTORTION

Fig. 13
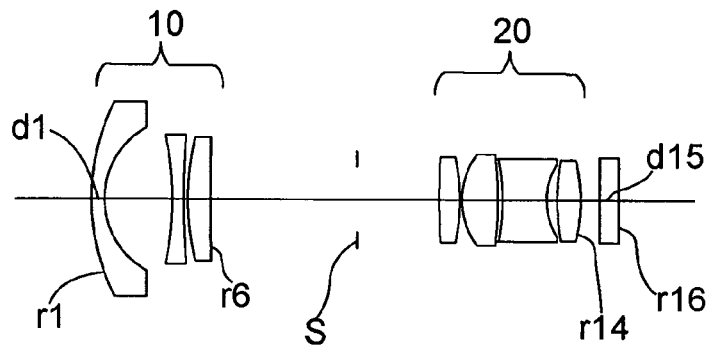
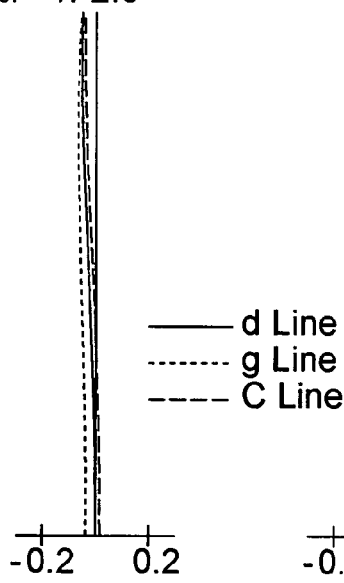
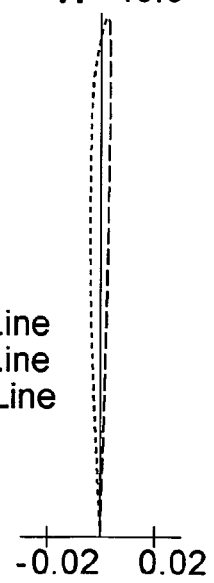
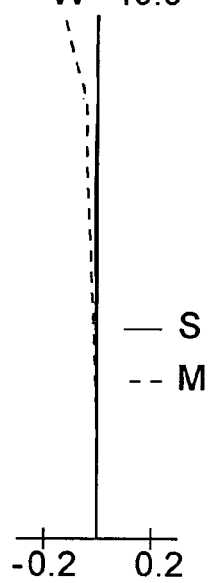
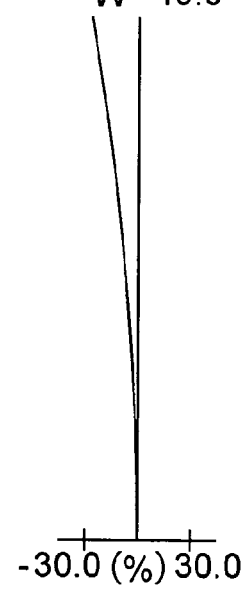
Fig. 14A  Fig. 14B  Fig. 14C  Fig. 14D
SPHERICAL ABERRATION
CHROMATIC ABERRATION
LATERAL CHROMATIC ABERRATION
ASTIGMATISM
DISTORTION FNo.= 1: 2.6

—— d Line
----- g Line
---- C Line

-0.2  0.2
SPHERICAL
ABERRATION
CHROMATIC
ABERRATION

W=24.2°

-0.02  0.02
LATERAL
CHROMATIC
ABERRATION

W=24.2°

— S
-- M

-0.2  0.2
ASTIGMATISM

W=24.2°

-30.0(%) 30.0
DISTORTION

ZOOM LENS SYSTEM

BACKGROUND OF THE INVENTION

1. Field of the Invention

The present invention relates to a zoom lens system, and in particular, relates to a zoom lens system appropriate for a digital camera.

2. Description of the Prior Art

In recent years, for the purpose of being used with a digital camera utilizing a solid-state image sensor such as a miniaturized imaging device or CDD, a smaller zoom lens system, which has a small (fast) f-number, and has a variable angle-of-view, has been in demand.

SUMMARY OF THE INVENTION

The present invention provides a retrofocus-type zoom lens system including a first lens group having a negative refractive power (hereinafter, a negative first lens group), a diaphragm, and a second lens group having a positive refractive power (hereinafter, a positive second lens group), in this order from the object.

The retrofocus-type zoom lens system is small in size, has a fast f-number of no greater than 2, has a zoom ratio of approximately 2, and has a half angle-of-view of approximately 50° at the short focal length extremity.

According to an aspect of the present invention, there is provided a zoom lens system including a negative first lens group, a diaphragm, and a positive second lens group, in this order from the object.

Zooming is performed by moving the negative first lens group and the positive second lens group along an optical axis of the zoom lens system.

The negative first lens group includes a negative first lens element, a negative second lens element, and a positive third lens element, in this order from the object.

The zoom lens system satisfies the following condition:

$$0.7 < ft/f2G < 1.1 \quad (1)$$

wherein ft designates the focal length of the entire zoom lens system at the long focal length extremity; and f2G designates the focal length of the positive second lens group.

The zoom lens system of the present invention preferably satisfies the following condition:

$$3.0 < (d12w - d12t)/(ft/fw) < 5.0 \quad (2)$$

wherein d12w designates the distance between the negative first lens group and the positive second lens group at the short focal length extremity;

d12t designates the distance between the negative first lens group and the positive second lens group at the long focal length extremity; and fw designates the focal length of the entire zoom lens system at the short focal length extremity.

The zoom lens system of the present invention preferably satisfies the following condition:

$$3.0 < \Sigma 2G/(ft/fw) < 4.0 \quad (3)$$

wherein

Σ2G designates the thickness of the positive second lens group, i.e., the distance from the most object-side surface of the positive second lens group to the most image-side surface thereof; and fw designates the focal length of the entire zoom lens system at the short focal length extremity.

The zoom lens system of the present invention preferably satisfies the following condition:

$$0.6 < f1n/f2n < 1.2 \quad (4)$$

wherein f1n designates the focal length of the negative first lens element of the negative first lens group; and f2n designates the focal length of the negative second lens element of the negative first lens group.

The negative second lens element of the negative first lens group can be constituted by a negative biconcave lens element.

The positive second lens group can include a positive first lens element, a positive second lens element, a negative third lens element, and a positive fourth lens element, in this order from the object.

The positive second lens group preferably satisfies the following condition:

$$vp - vn > 23 \quad (5)$$

wherein vp designates the Abbe number of the positive second lens element of the positive second lens group; and vn designates the Abbe number of the negative third lens element of the positive second lens group.

The zoom lens system of the present invention preferably satisfies the following condition:

$$-1.1 < ft/f1G < -0.6 \quad (6)$$

wherein f1G designates the focal length of the negative first lens group.

The fourth lens element of the positive second lens group preferably includes at least one aspherical surface.

It is preferable that the diaphragm be stationary as a stationary unit at a predetermined position along the optical axis so that the distance between the diaphragm and the image plane of said zoom lens system does not vary.

The present disclosure relates to subject matter contained in Japanese Patent Application No. 2004-217094 (filed on Jul. 26, 2004) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system according to a first embodiment of the present invention;

FIGS. 2A, 2B, 2C and 2D show aberrations occurred in the lens arrangement shown in FIG. 1, at the short focal length extremity;

FIG. 4 is a lens arrangement of the zoom lens system according to a second embodiment of the present invention;

FIGS. 5A, 5B, 5C and 5D show aberrations occurred in the lens arrangement shown in FIG. 4, at the short focal length extremity;

FIGS. 6A, 6B, 6C and 6D show aberrations occurred in the lens arrangement shown in FIG. 4, at the long focal length extremity;

FIG. 7 is a lens arrangement of the zoom lens system according to a third embodiment of the present invention;

FIGS. 8A, 8B, 8C and 8D show aberrations occurred in the lens arrangement shown in FIG. 7, at the short focal length extremity;

FIG. 10 is a lens arrangement of the zoom lens system according to a fourth embodiment of the present invention;

FIGS. 11A, 11B, 11C and 11D show aberrations occurred in the lens arrangement shown in FIG. 10, at the short focal length extremity;

FIG. 13 is a lens arrangement of the zoom lens system according to a fifth embodiment of the present invention;

FIGS. 14A, 14B, 14C and 14D show aberrations occurred in the lens arrangement shown in FIG. 13, at the short focal length extremity;

DESCRIPTION OF THE PREFERRED EMBODIMENTS

Figure 3A:
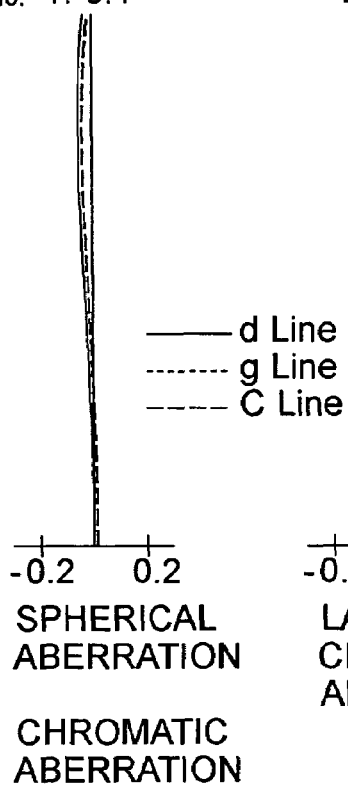
FIGS. 3A, 3B, 3C and 3D show aberrations occurred in the lens arrangement shown in FIG. 1, at the long focal length extremity.
Figure 3B:
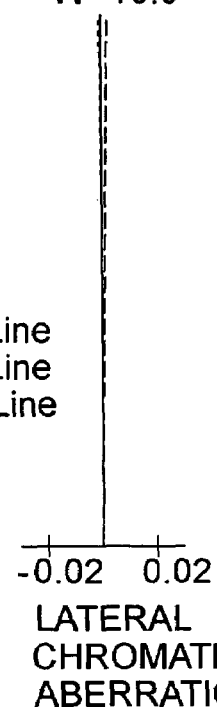
Figure 3C:
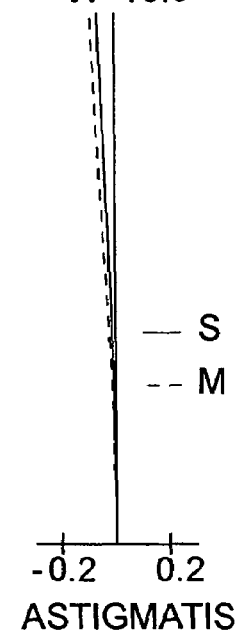
Figure 3D:
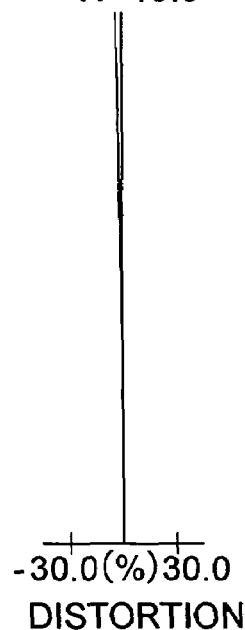
Figure 9A:
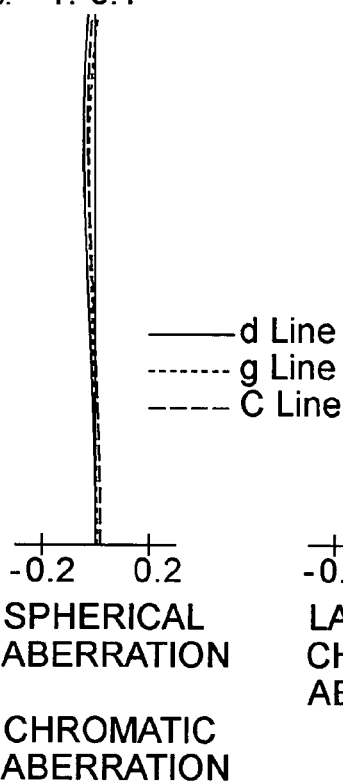
FIGS. 9A, 9B, 9C and 9D show aberrations occurred in the lens arrangement shown in FIG. 7, at the long focal length extremity.
Figure 9B:
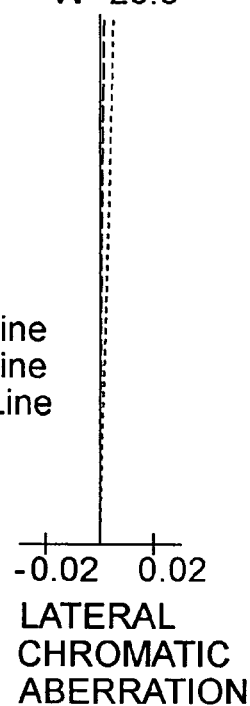
Figure 9C:
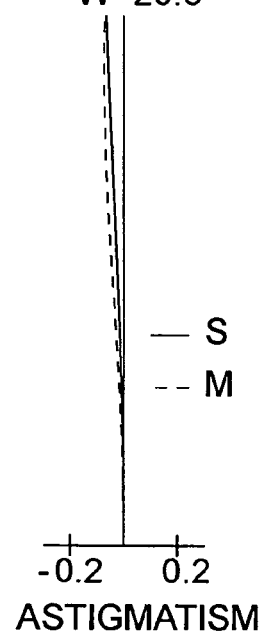
Figure 9D:
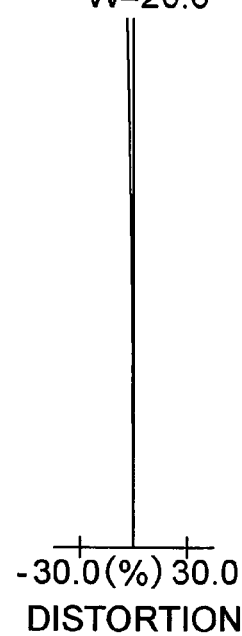
Figure 12A:
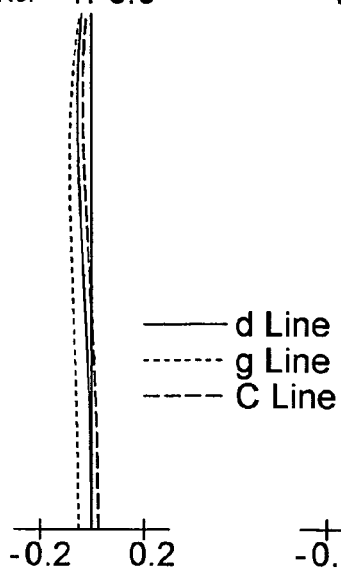
FIGS. 12A, 12B, 12C and 12D show aberrations occurred in the lens arrangement shown in FIG. 10, at the long focal length extremity.
Figure 12B:
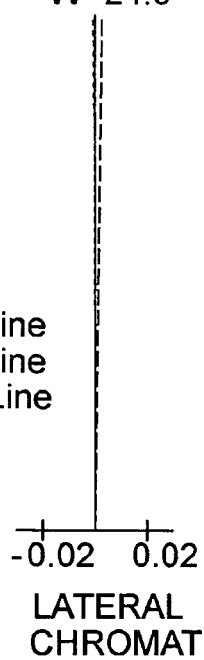
Figure 12C:
Figure 12D:
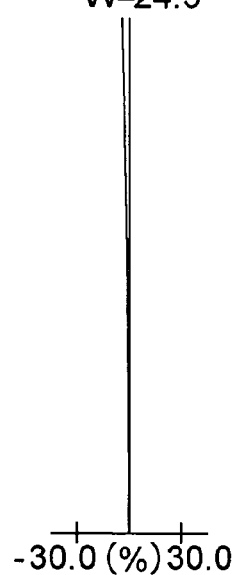
Figure 15A:
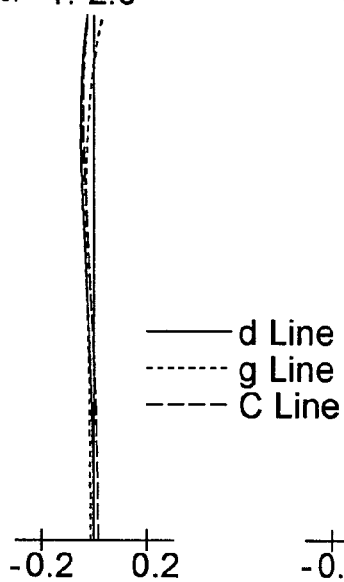
FIGS. 15A, 15B, 15C and 15D show aberrations occurred in the lens arrangement shown in FIG. 13, at the long focal length extremity.
Figure 15B:
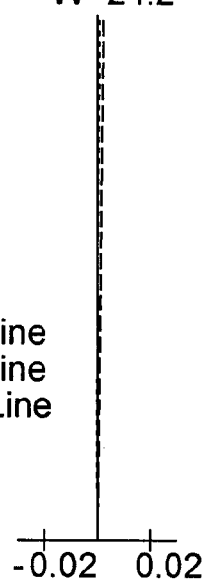
Figure 15C:
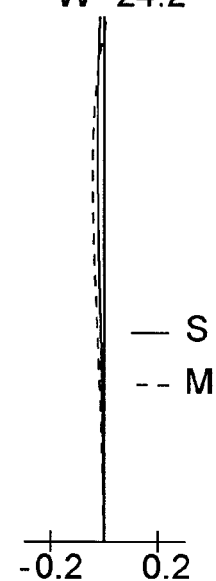
Figure 15D:
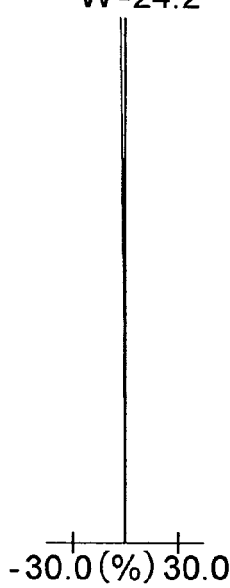
Figure 16:
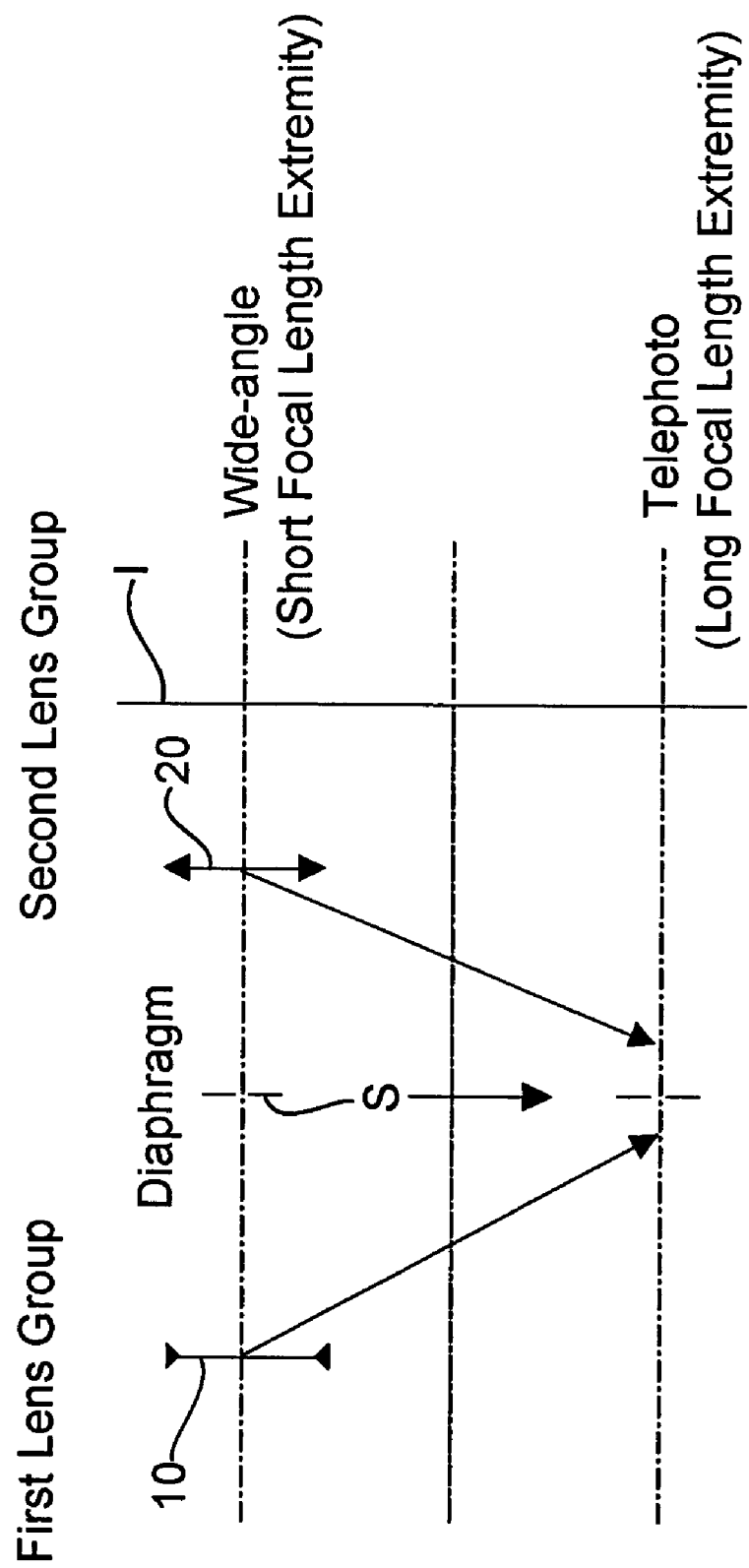
FIG. 16 is the schematic view of the lens-group moving paths for the zoom lens system according to the present invention.

The zoom lens system of the present invention, as shown in the lens-group moving paths of FIG. 16, includes a negative first lens group 10, a diaphragm S, and a positive second lens group 20, in this order from the object.

Upon zooming from the short focal length extremity to the long focal length extremity, the negative first lens group 10 moves toward the image, and the positive second lens group 20 moves toward the object.

The axial position of the diaphragm S remains stationary so that the distance between the diaphragm S and the image plane does not vary upon zooming. In the case where the diaphragm (diaphragm unit) S remains stationary, the distances between the diaphragm S and the negative first lens group 10, and the distance between the diaphragm S and the positive second lens group 20 can be both made longer at the short focal length extremity. This arrangement is advantageous for correcting off-axis aberrations occurring over a wider angle-of-view.

In a zoom lens system for a digital camera which is provided with a solid-state image sensor such as a CDD, it has been known that telecentricity is required from the short focal length extremity to the long focal length extremity in order to prevent the occurrence of shading and so forth. Namely, in order to perform zooming with a smaller emitting angle, it is generally advantageous to employ a retrofocus-type zoom lens system having a negative lens group and a positive lens group in this order from the object; and hence, the zoom lens system of the present invention employs a retrofocus-type zoom lens system.

In addition, the zoom lens system of the present invention achieves a half angle-of-view of approximately 50° at the short focal length extremity.

The theoretically minimum required number of lens elements for the negative first lens group 10 is two, i.e., a negative lens element and a positive lens element.

However, if an attempt is made to achieve a half angle-of-view of approximately 50° with the two lens elements, the radius of curvature of the second surface (i.e., the image-side surface) of the negative first lens element becomes too small, which may cause the occurrence of off-axis aberrations. Therefore in the zoom lens system of the present invention, the number of lens elements constituting the negative first lens group 10 is increased to three, i.e., the negative first lens element, the negative second lens element, and the positive third lens element, in this order from the object.

It goes without saying that the negative first lens group 10 constituted by four lens elements can more easily correct aberrations than the negative first lens group 10 with less-than-four lens elements can. However, such a four lens-element-arrangement increases the thickness of the negative first lens group 10. Consequently, the overall length of the zoom lens system increases, and a smaller zoom lens system cannot be attained.

In order to make the overall length of the zoom lens system shorter, the traveling distance of each lens group, and the thickness of each lens group should be considered.

In the present invention, upon zooming from the short focal length extremity to the long focal length extremity, the negative first lens group 10 is arranged to move toward the image, and the positive second lens group 20 is arranged to move toward the object. Due to this arrangement, if an attempt is made to set the traveling distance of each lens group longer for the purpose of attaining a larger zoom ratio, the overall length of the zoom lens system at the short focal length extremity becomes undesirably longer.

Condition (1) relates to the refractive power of the positive second lens group 20. By making the refractive power thereof stronger so that condition (1) is satisfied, the zoom ratio can be made larger, while the occurrence of aberration is reduced.

If the refractive power of the positive second lens group 20 is made stronger to the extent that ft/f2G exceeds the upper limit of condition (1), aberrations excessively occur in the positive second lens group 20. Consequently, it becomes difficult to correct off-axis aberrations in a focal-length range from the short focal length extremity to an intermediate focal length. Likewise, it becomes difficult to correct axial aberrations in the other focal-length range from the intermediate focal length to the long focal length extremity.

If the refractive power of the positive second lens group 20 is made weaker to the extent that ft/f2G exceeds the lower limit of condition (1), it becomes difficult to correct the remaining aberrations caused by the negative refractive power of the negative first lens group 10. Here, note that the negative refractive power of the negative first lens group 10 is necessary to maintain adequate telecentricity.

Condition (2) specifies the amount of change of the distance between the negative first lens group 10 and the positive second lens group 20 upon zooming. In other words, condition (2) is to express the most suitable balance among the zoom ratio, the change of aberrations upon zooming and the traveling distance of each lens group, under the condition that condition (1) has been satisfied.

If (d12w−d12t)/(ft/fw) exceeds the upper limit of condition (2), the amount of change of the distance between the negative first lens group 10 and the positive second lens group 20 becomes larger, so that the diaphragm and the image plane come too close to each other, and the positive second lens group 20 and the image plane also come too close to each other. Consequently, if an attempt is made to maintain telecentricity, the positive refractive power of the positive second lens group 20 becomes too weak, and then the lower limit of condition (1) is exceeded.

If (d12w−d12t)/(ft/fw) exceeds the lower limit of condition (2), the traveling distance of each lens group becomes shorter. Consequently, if an attempt is made to maintain a sufficient zoom ratio, the refractive power of the positive second lens group 20 becomes too strong, and then the upper limit of condition (1) is exceeded.

Condition (3) specifies the thickness of the positive second lens group 20 for the purpose of maintaining a balance between miniaturization of the zoom lens system and the correcting of aberrations in the case where the f-number is made smaller, after condition (1) has been satisfied.

If Σ2G/(ft/fw) exceeds the upper limit of condition (3), the thickness of the positive second lens group 20 becomes too large, so that the refractive power of the positive second lens group 20 becomes too strong since the traveling distance of the positive second lens group 20 cannot be secured. Consequently, the correcting of off-axis aberrations becomes difficult at the short focal length extremity.

If Σ2G/(ft/fw) exceeds the lower limit of condition (3), the number of lens elements to constitute the positive second lens group 20 becomes smaller, so that the correcting of aberrations in the positive second lens group 20 cannot be sufficiently performed. Consequently, aberration fluctuations become larger, and the required f-number cannot be achieved, i.e., a fast lens system cannot be achieved.

Condition (4) specifies the refractive power to be provided in the negative first lens element and the negative second lens element of the negative first lens group 10.

In the zoom lens system of the present invention, the negative first lens group 10 is constituted by the negative first lens element, the negative second lens element, and the positive third lens element. The strong negative refractive power of the negative first lens group 10 is distributed over the two negative lens elements in a well balanced manner. However, if the refractive power of one of the two negative lens elements is excessively stronger than the other, the correcting of aberrations in the negative first lens group 10 becomes difficult. More specifically, the correcting of off-axis aberrations in a focal-length range from the short focal length extremity to an intermediate focal length becomes difficult, and the correcting of axial aberrations in the other focal-length range from the intermediate focal length to the long focal length extremity also becomes difficult.

In order to reduce the thickness of the negative first lens group 10, it is advantageous for the middle negative lens element (i.e., the negative second lens element) to be formed as a negative biconcave lens element.

The positive second lens group 20 can generally be constituted by a triplet lens arrangement, i.e., a positive first lens element, a negative second lens element and another positive third lens element. On the other hand, if an attempt is made to correct axial aberrations, particularly spherical aberration, while the f-number is maintained smaller, the positive second lens group 20 is preferably constituted by four lens elements, i.e., a positive first lens element, a positive second lens element, a negative third lens element, and a positive fourth lens element, in this order from the object. It goes without saying that the positive second lens group 20 with five or more lens elements can more easily correct aberrations.

Then, as shown in the embodiments of the present invention, in the case where the positive second lens group 20 is constituted by the above four-lens-element arrangement for the purpose of achieving a fast zoom lens system having an f-number of no greater than 2 at the short focal length extremity and an f-number of approximately 3 at the long focal length extremity, it is desirable to correct chromatic aberration by differentiating an Abbe number of the positive second lens element from that of the negative third lens element.

Condition (5) relates to the difference in the Abbe numbers.

If the difference in the Abbe numbers with respect to the positive second lens element and the negative third lens element is smaller to the extent that νp−νn exceeds the lower limit of condition (5), the correcting of chromatic aberration under a smaller f-number becomes difficult.

Condition (6) specifies the refractive power of the negative first lens group 10.

If ft/f1G exceeds the upper limit of condition (6), the refractive power of the negative first lens group 10 becomes weaker. Accordingly, it is necessary to make the refractive power of the positive second lens group 20 weaker. Even if an attempt is made to achieve a required zoom ratio through the negative first lens group 10 and the positive second lens group 20, both oh which has a weaker refractive power, the positive second lens group 20 has to be positioned closer to the image plane at the short focal length extremity. Here, it should be noted that telecentricity cannot be maintained under such a short distance between the positive second lens group 20 and the image plane.

If ft/f1G exceeds the lower limit of condition (6), the refractive power of the negative first lens group 10 becomes too strong. Consequently, the correcting of off-axis aberrations at the short focal length extremity becomes difficult.

In the zoom lens system of the present invention, if an attempt is made to achieve further miniaturization and higher quality, it is desirable to provide at least one aspherical surface on the most image-side surface of the positive second lens group 20.

Specific numerical data of the embodiments will be described hereinafter.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, $F_{NO.}$ designates the f-number, f designates the focal length of the zoom lens system, W designates the half angle-of-view (°), fB designates the back focal distance (the equivalent air thickness from the most image-side surface of the positive second lens group 20 to the imaging surface of an imaging device), r designates the radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

EMBODIMENT 1

FIG. 1 is the lens arrangement of the zoom lens system according to the first embodiment of the present invention. FIGS. 2A through 2D show aberrations occurred in the lens arrangement shown in FIG. 1, at the short focal length extremity. FIGS. 3A through 3D show aberrations occurred in the lens arrangement shown in FIG. 1, at the long focal length extremity. Table 1 shows the numerical data of the first embodiment.

The negative first lens group 10 (surface Nos. 1 through 6) includes a negative meniscus lens element having the convex surface facing toward the object, a negative biconcave lens element, and a positive lens element having a convex surface facing toward the object, in this order from the object.

The positive second lens group 20 (surface Nos. 7 through 14) includes a positive biconvex lens element, a positive meniscus lens element having the convex surface facing toward the object, a negative biconcave lens element, and a positive biconvex lens element, in this order from the object.

Surface Nos. 15 and 16 define a cover glass provided in front of an imaging device (not shown).

The diaphragm S is provided 7.63 behind (on the image side of) the negative first lens group 10 (surface No. 6) at the short focal length extremity, and is provided 1.00 behind the negative first lens group 10 at the long focal length extremity.

TABLE 1

FNO. = 1:1.9-3.1
f = 2.85-6.88 (Zoom Ratio = 2.41)
W = 49.1-19.9
fB = 5.06-9.35

| Surf. No. | r | d | Nd | ν |
|---|---|---|---|---|
| 1 | 15.818 | 0.70 | 1.77250 | 49.6 |
| 2 | 4.816 | 3.11 | | |
| 3 | −22.259 | 0.60 | 1.85000 | 42.8 |
| 4 | 10.970 | 0.42 | | |
| 5 | 10.149 | 1.65 | 1.84666 | 23.8 |
| 6 | ∞ | 12.92-2.00 | | |
| 7 | 7.676 | 1.77 | 1.65001 | 53.5 |
| 8 | −32.986 | 0.10 | | |
| 9 | 6.201 | 1.87 | 1.58897 | 62.2 |
| 10 | 93.683 | 0.29 | | |
| 11 | −17.367 | 1.64 | 1.83809 | 25.3 |
| 12 | 5.484 | 0.99 | | |
| 13 | 6.528 | 1.92 | 1.66626 | 55.2 |
| 14* | −14.874 | 1.00-5.29 | | |
| 15 | ∞ | 2.91 | 1.49782 | 66.8 |
| 16 | ∞ | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 14 | 0.00 | 0.13326 × 10$^{-2}$ | 0.68521 × 10$^{-4}$ | −0.28069 × 10$^{-5}$ |

EMBODIMENT 2

FIG. 4 is the lens arrangement of the zoom lens system according to the second embodiment of the present invention. FIGS. 5A through 5D show aberrations occurred in the lens arrangement shown in FIG. 4, at the short focal length extremity. FIGS. 6A through 6D show aberrations occurred in the lens arrangement shown in FIG. 4, at the long focal length extremity. Table 2 shows the numerical data of the second embodiment.

The basic lens arrangement of the second embodiment is the same as the first embodiment except the following:

In the positive second lens group 20, the positive biconvex second lens element and the negative biconcave third lens element are bonded to each other to form cemented lens elements.

The diaphragm S is provided 8.58 behind (on the image side of) the negative first lens group 10 (surface No. 6) at short focal length extremity, and is provided 1.29 behind the negative first lens group 10 at the long focal length extremity.

TABLE 2

FNO. = 1:1.9-3.1
f = 2.85-7.15 (Zoom Ratio = 2.51)
W = 49.1-19.1
fB = 4.63-9.01

| Surf. No. | r | d | Nd | ν |
|---|---|---|---|---|
| 1 | 14.780 | 0.70 | 1.81454 | 44.6 |
| 2 | 4.851 | 3.05 | | |
| 3 | −17.859 | 0.60 | 1.76524 | 47.1 |
| 4 | 11.862 | 0.38 | | |
| 5 | 10.502 | 1.66 | 1.84666 | 23.8 |
| 6 | ∞ | 13.96-2.29 | | |
| 7 | 12.061 | 1.37 | 1.83400 | 45.6 |
| 8 | −43.866 | 0.10 | | |
| 9 | 5.792 | 2.23 | 1.54132 | 65.1 |
| 10 | −14.300 | 2.63 | 1.82730 | 27.1 |
| 11 | 4.633 | 0.73 | | |
| 12 | 5.859 | 2.20 | 1.66626 | 55.2 |
| 13* | −18.834 | 1.00-5.38 | | |
| 14 | ∞ | 2.91 | 1.49782 | 66.8 |
| 15 | ∞ | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 13 | 0.00 | 0.10012 × 10$^{-2}$ | 0.81948 × 10$^{-4}$ | −0.45202 × 10$^{-5}$ |

EMBODIMENT 3

FIG. 7 is the lens arrangement of the zoom lens system according to a third embodiment of the present invention.

FIGS. 8A through 8D show aberrations occurred in the lens arrangement shown in FIG. 7, at the short focal length extremity. FIGS. 9A through 9D show aberrations occurred in the lens arrangement shown in FIG. 7, at the long focal length extremity. Table 3 shows the numerical data of the third embodiment.

The basic lens arrangement of the third embodiment is the same as the second embodiment.

The diaphragm S is provided 8.82 behind (on the image side of) the negative first lens group 10 (surface No. 6) at short focal length extremity, and is provided 1.30 behind the first lens group 10 at the long focal length extremity.

TABLE 3

FNO. = 1:1.9-3.1
f = 2.85-7.15 (Zoom Ratio = 2.51)
W = 53.4-20.6
fB = 4.99-9.42

| Surf. No. | r | d | Nd | ν |
|---|---|---|---|---|
| 1 | 17.594 | 0.70 | 1.83481 | 42.7 |
| 2 | 5.080 | 3.07 | | |
| 3 | −21.905 | 0.60 | 1.77250 | 49.6 |
| 4 | 11.112 | 0.41 | | |
| 5 | 10.318 | 1.83 | 1.84666 | 23.8 |
| 6 | ∞ | 14.34-2.40 | | |
| 7 | 11.855 | 1.33 | 1.80400 | 46.6 |
| 8 | −49.556 | 0.10 | | |
| 9 | 5.870 | 2.30 | 1.53172 | 48.9 |
| 10 | −16.041 | 2.44 | 1.84666 | 23.8 |
| 11 | 5.217 | 0.66 | | |
| 12 | 6.553 | 2.26 | 1.69350 | 53.2 |
| 13* | −21.530 | 1.00-5.43 | | |
| 14 | ∞ | 2.91 | 1.49782 | 66.8 |
| 15 | ∞ | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 13 | 0.00 | $0.10356 \times 10^{-2}$ | $0.71422 \times 10^{-4}$ | $-0.31316 \times 10^{-5}$ |

EMBODIMENT 4

FIG. 10 is the lens arrangement of the zoom lens system according to the fourth embodiment of the present invention. FIGS. 11A through 11D show aberrations occurred in the lens arrangement shown in FIG. 10, at the short focal length extremity. FIGS. 12A through 12D show aberrations occurred in the lens arrangement shown in FIG. 10, at the long focal length extremity. Table 4 shows the numerical data of the fourth embodiment.

The basic lens arrangement of the fourth embodiment is the same as the first embodiment.

The diaphragm S is provided 4.49 behind (on the image side of) the negative first lens group 10 (surface No. 6.) at the short focal length extremity, and is provided 1.00 behind the negative first lens group 10 at the long focal length extremity.

TABLE 4

FNO. = 1:2.0-3.0
f = 2.85-5.50 (Zoom Ratio = 1.92)
W = 47.7-24.5
fB = 4.98-7.70

| Surf. No. | r | d | Nd | ν |
|---|---|---|---|---|
| 1 | 10.712 | 0.70 | 1.83361 | 42.8 |
| 2 | 3.591 | 1.92 | | |
| 3 | −14.623 | 0.60 | 1.85000 | 42.8 |
| 4 | 12.000 | 0.38 | | |
| 5 | 9.031 | 1.20 | 1.84666 | 23.8 |
| 6 | −114.569 | 8.22-2.00 | | |
| 7 | 21.333 | 1.10 | 1.83400 | 37.2 |
| 8 | −16.033 | 0.10 | | |
| 9 | 4.196 | 1.85 | 1.60000 | 61.6 |
| 10 | −47.118 | 0.27 | | |
| 11 | −14.215 | 1.21 | 1.84069 | 25.2 |
| 12 | 3.967 | 0.66 | | |
| 13 | 7.461 | 1.49 | 1.66626 | 55.2 |
| 14* | −7.104 | 1.00-3.72 | | |
| 15 | ∞ | 1.00 | 1.51633 | 64.1 |
| 16 | ∞ | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 14 | 0.00 | $0.98001 \times 10^{-3}$ | $0.12780 \times 10^{-3}$ | $-0.13018 \times 10^{-4}$ |

EMBODIMENT 5

FIG. 13 is the lens arrangement of the zoom lens system according to the fifth embodiment of the present invention. FIGS. 14A through 14D show aberrations occurred in the lens arrangement shown in FIG. 13, at the short focal length extremity. FIGS. 15A through 15D show aberrations occurred in the lens arrangement shown in FIG. 13, at the long focal length extremity. Table 5 shows the numerical data of the fifth embodiment.

The basic lens arrangement of the fifth embodiment is the same as the first embodiment; however, no aspherical surface is provided in the zoom lens system of the fifth embodiment.

The diaphragm S is provided 7.64 behind (on the image side of) the negative first lens group 10 (surface No. 6) at the short focal length extremity, and is provided 1.00 behind the negative first lens group 10 at the long focal length extremity.

TABLE 5

FNO. = 1:2.0-2.6
f = 2.85-5.50 (Zoom Ratio = 1.92)
W = 49.0-24.2
fB = 3.95-6.08

| Surf. No. | r | d | Nd | ν |
|---|---|---|---|---|
| 1 | 11.450 | 0.70 | 1.77250 | 49.6 |
| 2 | 4.413 | 3.54 | | |
| 3 | −17.012 | 0.60 | 1.85000 | 42.8 |
| 4 | 38.217 | 0.24 | | |
| 5 | 13.677 | 1.20 | 1.84666 | 23.8 |
| 6 | 99.368 | 12.02-3.25 | | |

TABLE 5-continued

FNO. = 1:2.0-2.6
f = 2.85-5.50 (Zoom Ratio = 1.92)
W = 49.0-24.2
fB = 3.95-6.08

| Surf. No. | r | d | Nd | ν |
|---|---|---|---|---|
| 7 | 54.508 | 1.10 | 1.83400 | 37.2 |
| 8 | −10.737 | 0.10 | | |
| 9 | 4.085 | 1.91 | 1.55911 | 63.9 |
| 10 | −20.120 | 0.24 | | |
| 11 | −11.196 | 2.30 | 1.85000 | 24.1 |
| 12 | 3.759 | 0.55 | | |
| 13 | 11.684 | 1.21 | 1.85000 | 43.5 |
| 14 | −9.377 | 1.00-3.13 | | |
| 15 | ∞ | 1.00 | 1.51633 | 64.1 |
| 16 | ∞ | — | | |

Table 6 shows the numerical values of each embodiment for each condition.

TABLE 6

| | Embod.1 | Embod.2 | Embod.3 | Embod.4 | Embod.5 |
|---|---|---|---|---|---|
| Cond.(1) | 0.92 | 0.95 | 0.94 | 0.89 | 0.85 |
| Cond.(2) | 4.52 | 4.65 | 4.76 | 3.22 | 4.55 |
| Cond.(3) | 3.55 | 3.69 | 3.62 | 3.45 | 3.84 |
| Cond.(4) | 1.08 | 0.99 | 0.93 | 0.88 | 0.71 |
| Cond.(5) | 36.93 | 38.02 | 25.12 | 36.44 | 39.78 |
| Cond.(6) | −0.97 | −0.97 | −0.96 | −0.92 | −0.68 |

As can be understood from Table 6, the numerical values of the first through fifth embodiments satisfy conditions (1) through (6), and as shown in the aberration diagrams, the various aberrations are well corrected.

According to the above description, a retrofocus-type zoom lens system with the following features can be obtained:

(i) being smaller in size;
(ii) a fast f-number of no greater than 2;
(iii) a zoom ratio of approximately 2; and
(iv) a half angle-of-view of approximately 50° at the short focal length extremity.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a diaphragm, and a positive second lens group, in this order from an object,
   wherein zooming is performed by moving said negative first lens group and said positive second lens group along an optical axis of said zoom lens system;
   wherein said negative first lens group comprises a negative first lens element, a negative second lens element, and a positive third lens element, in this order from the object; and
   wherein said zoom lens system satisfies the following conditions:

$0.7 < ft/f2G < 1.1$ $3.0 < (d12w - d12t)/(ft/fw) < 5.0$ wherein
   ft designates the focal length of the entire zoom lens system at the long focal length extremity;
   f2G designates the focal length of said positive second lens group; d12w designates the distance between said negative first lens group and said positive second lens group at the short focal length extremity;
   d12w designates the distance between said negative first lens group and said positive second lens group at the short focal length extremity;
   d12t designates the distance between said negative first lens group and said positive second lens group at the lone focal length extremity: and
   fw designates the focal length of the entire zoom lens system at the short focal length extremity.

2. The zoom lens system according to claim 1, further satisfying the following condition:

$3.0 < \Sigma 2G/(ft/fw) < 4.0$ wherein
   Σ20 G designates the thickness of aid positive second lens group, i.e., the distance from the most object-side surface of said positive second lens group to the most image-side surface thereof; and
   fw designates the focal length of the entire zoom lens system at the short focal length extremity.

3. The zoom lens system according to claim 1, further satisfying of the following condition:

$0.6 < f1n/f2n < 1.2$ wherein
   f1n designates the focal length of said negative first lens element of said negative first lens group; and
   f2n designates the focal length of said negative second lens element of said negative first lens group.

4. The zoom lens system according to claim 1, wherein said negative second lens element of said negative first lens group comprises a negative biconcave lens element.

5. The zoom lens system according to claim 1, wherein said positive second lens group comprises a positive first lens element, a positive second lens element, a negative third lens element, and a positive fourth lens element, in this order from the object.

6. The zoom lens system according to claim 5, satisfying the following condition:

$\nu p - \nu n > 23$ wherein
   νp designates the Abbe number of said positive second lens element of said positive second lens group; and
   νn designates the Abbe number of said negative third lens element of said positive second lens group.

7. The zoom lens system according to claim 5, wherein said positive fourth lens element of said positive second lens group comprises at least one aspherical surface.

8. The zoom lens system according to claim 1, farther satisfying the following condition:

$-1.1 < ft/f1G < -0.6$ wherein
   f1G designates the focal length of said negative first lens group.

9. The zoom lens system according to claim 1, wherein said diaphragm is stationary at a predetermined position along the optical axis so that the distance between said diaphragm and the image plane of said zoom lens system does not vary.

10. A zoom lens system comprising: a negative first lens group; a diaphragm; and a positive second lens group, in this order from an object, wherein:
   zooming is performed by moving said negative first lens group and said positive second lens group along an optical axis of said zoom lens system;
   said negative first lens group comprises a negative first lens element, a negative second lens element, and a positive third lens element, in this order from the object; and
   said zoom lens system satisfies the following conditions:

$0.7 < ft/f2G < 1.1$ $3.0 < \Sigma 2G/(ft/fw) < 4.0$ wherein
   ft designates the focal length of the entire zoom lens system at the long focal length extremity;
   f2G designates the focal length of said positive second lens group;
   Σ2G designates the thickness of said positive second lens group, i.e., the distance from the most object-side surface of said positive second lens group to the most image-side surface thereof; and
   fw designates the focal length of the entire zoom lens system at the short focal length extremity.

11. The zoom lens system according to claim 10, further satisfying of the following condition:

$0.6 < f1n/f2n < 1.2$ wherein
   f1n designates the focal length of said negative first lens element of said negative first lens group; and
   f2n designates the focal length of said negative second lens element of said negative first lens group.

12. The zoom lens system according to claim 10, wherein said negative second lens element of said negative first lens group comprises a negative biconcave lens element.

13. The zoom lens system according to claim 10, wherein said positive second lens group comprises a positive first lens element, a positive second lens element, a negative third lens element, and a positive fourth lens element, in this order from the object.

14. The zoom lens system according to claim 13, wherein said positive fourth lens element of said positive second lens group comprises at least one aspherical surface.

15. The zoom lens system according to claim 13, satisfying the following condition:

$vp - vn > 23$ wherein
   vp designates the Abbe number of said positive second lens element of said positive second lens group; and
   vn designates the Abbe number of said negative third lens element of said positive second lens group.

16. The zoom lens system according to claim 10, further satisfying the following condition:

$-1.1 < ft/f1G < -0.6$ wherein
   f1G designates the focal length of said negative first lens group.

17. The zoom lens system according to claim 10, wherein said diaphragm is stationary at a predetermined position along the optical axis so that the distance between said diaphragm and the image plane of said zoom lens system does not vary.

18. A zoom lens system comprising a negative first lens group; a diaphragm; and a positive second lens group, in this order from an object, wherein:
   zooming is performed by moving said negative first lens group and said positive second lens group along an optical axis of said zoom lens system;
   said negative first lens group comprises a negative first lens element, a negative second lens element, and a positive third lens element, in this order from the object; and
   said zoom lens system satisfies the following conditions:

$0.7 < ft/f2G < 1.1$ $0.6 < f1n/f2n < 1.2$ wherein
   ft designates the focal length of the entire zoom lens system at the long focal length extremity;
   f2G designates the focal length of said positive second lens group,
   f1n designates the focal length of said negative first lens element of said negative first lens group; and
   f2n designates the focal length of said negative second lens element of said negative first lens group.

19. The zoom lens system according to claim 18, wherein said negative second lens element of said negative first lens group comprises a negative biconcave lens element.

20. The zoom lens system according to claim 18, wherein said positive second lens group comprises a positive first lens element, a positive second lens element, a negative third lens clement, and a positive fourth lens element, in this order from the object.

21. The zoom lens system according to claim 20, satisfying the following condition:

$vp - vn > 23$ wherein
   vp designates the Abbe number of said positive second lens element of said positive second lens group; and
   vn designates the Abbe number of said negative third lens element of said positive second lens group.

22. The zoom lens system according to claim 20, wherein said positive fourth lens element of said positive second lens group comprises at least one aspherical surface.

23. The zoom lens system according to claim 18, further satisfying the following condition:

$-1.1 < ft/f1G < -0.6$ wherein
   f1G designates the focal length of said negative first lens group.

24. The zoom lens system according to claim 18, wherein said diaphragm is stationary at a predetermined position along the optical axis so that the distance between said diaphragm and the image plane of said zoom lens system does not vary.

25. A zoom lens system comprising: a negative first lens group; a diaphragm; and a positive second lens group, in this order from an object, wherein:
   said positive second lens group consists of a positive first lens element, a positive second lens element, a negative third lens element, and a positive fourth lens element, in this order from the object;
   said positive fourth lens element of said positive second lens group comprises at least one aspherical surface,
   zooming is performed by moving said negative first lens group and said positive second lens group along an optical axis of said zoom lens system;

said negative first lens group comprises a negative first lens element, a negative second lens element, and a positive third lens element, in this order from the object; and said zoom lens system satisfies the following condition:

$$0.7 < ft/f2G < 1.1$$

wherein ft designates the focal length of the entire zoom lens system at the long focal length extremity; and f2G designates the focal length of said positive second lens group.

26. The zoom lens system according to claim 25, wherein said negative second lens element of said negative first lens group comprises a negative biconcave lens element.

27. The zoom lens system according to claim 25, satisfying the following condition:

$$\nu p - \nu n > 23$$

wherein

νp designates the Abbe number of said positive second lens element of said positive second lens group; and νn designates the Abbe number of said negative third lens element of said positive second lens group.

28. The zoom lens system according to claim 25, further satisfying the following condition:

$$-1.1 < ft/f1G < -0.6$$

wherein f1G designates the focal length of said negative first lens group.

29. The zoom lens system according to claim 25, wherein said diaphragm is stationary at a predetermined position along the optical axis so that the distance between said diaphragm and the image plane of said zoom lens system does not vary.

* * * * *